(12) United States Patent
Hsu

(10) Patent No.: US 6,660,401 B2
(45) Date of Patent: Dec. 9, 2003

(54) DISPOSITION OF SOLDER FOR HEAT RESISTANT STRUCTURE

(76) Inventor: Charles Hsu, No. 12, 822 Lane, Kao Shi Road, Yangmei Cheng, Taoyuan (TW)

( * ) Notice: Subject to any disclaimer, the term of this patent is extended or adjusted under 35 U.S.C. 154(b) by 6 days.

(21) Appl. No.: 10/022,203

(22) Filed: Dec. 20, 2001

(65) Prior Publication Data

US 2003/0118856 A1 Jun. 26, 2003

(51) Int. Cl.[7] .............................. B32B 3/12; B01J 35/04; B01J 32/00
(52) U.S. Cl. ................ 428/593; 428/594; 502/527.22; 422/180
(58) Field of Search ................................ 428/593, 603, 428/594; 29/890; 228/181, 245, 246, 248.1, 190; 502/527.22; 422/180

(56) References Cited

U.S. PATENT DOCUMENTS

| | | | | |
|---|---|---|---|---|
| 4,381,590 A | * | 5/1983 | Nonnenmann et al. | 29/890 |
| 4,824,011 A | * | 4/1989 | Maus et al. | 228/173.7 |
| 5,084,361 A | * | 1/1992 | Toyoda et al. | 428/593 |
| 6,368,726 B1 | * | 4/2002 | Holpp et al. | 428/593 |
| 6,371,360 B1 | * | 4/2002 | Maus et al. | 228/181 |
| 2001/0013390 A1 | * | 8/2001 | Staubwasser | 156/205 |

FOREIGN PATENT DOCUMENTS

| | | | |
|---|---|---|---|
| DE | 20013920 | * | 11/2000 |
| JP | 59-42173 | * | 3/1984 |

* cited by examiner

*Primary Examiner*—John J. Zimmerman
(74) *Attorney, Agent, or Firm*—Troxell Law Office PLLC (57) ABSTRACT

The present invention provides a solder disposed configuration for a heat resistant structure for forming a catalytic converter for purifying the exhaust gas in an engine. The heat resistant structure is composed of a honeycomb structure fitted and fixed into a hollow cylindrical shell. And the honeycomb structure comprises at least a substrate having a flat sheet and a corrugated sheet. A first and a second strip of solder are disposed alongside a first and a second edge paralleling to each other on a first and a second plane surface of the substrate respectively, wherein the second plane surface is the reverse side of the first plane surface of the substrate, and the first and second edge are opposite to each other on the first and the second plane surface respectively for forming the honeycomb structure. Rolling up the substrate to form the honeycomb structure (e.g. spirally wound-form) by the solder disposed on the substrate welded and joined together. Thereafter, heat them with high temperature and under vacuum condition to weld the solders for joining and fixing each other to form the heat resistant structure.

9 Claims, 8 Drawing Sheets

Fig. 8

DISPOSITION OF SOLDER FOR HEAT RESISTANT STRUCTURE

FIELD OF THE INVENTION

The present invention is related to a solder disposed configuration for a heat resistant structure, more particularly, related to a configuration of a solder disposed on a substrate so as to prevent the heat resistant structure deformation from the thermal stress.

BACKGROUND OF THE INVENTION

Traditionally, a heat resistant structure is used as a catalytic converter under high temperature condition for purifying the exhaust gas in an engine. The heat resistant structure disposed between the exhaust outlet and the tailpipe of an engine (e.g. vehicle engine) is composed of a honeycomb structure fitted and fixed into a hollow cylindrical shell, wherein the honeycomb structure is formed by the solders on a substrate to weld and join a flat and a corrugated sheet together so as to be used for noxious emission and purifying the exhaust gas.

A substrate of the typical heat resistant structure is usually made of with a substantially uniform thickness of the flat and the corrugated sheets. After rolling up or superimposing the sheets, the substrate is formed in a roll-shape by brazing or in a wound multilayered block by brazing multilayer.

The honeycomb structure is coated with the noble metal catalyst (such as platinum Pt, palladium Pd, and rhodium Rh) for purifying the exhaust gas. As to the noxious emissions, carbon monoxide (CO), hydrocarbons (HC), and nitrogen oxides $NO_x$) may change to carbon dioxide ($CO_2$), water ($H_2O$), and nitrogen ($N_2$) by the catalytic action. In the meanwhile, the exothermic reaction may increase the temperature. Because the speed of exhausted gas flowing through the honeycomb structure along the central axis is the fastest and along the outer periphery is the lowest, the thermal stress is generated by the difference between the high temperature of central axis and the low temperature of outer periphery. There are two mainly stresses, normal stress and shear stress, acting perpendicular and parallel to the cut surface of the substrate respectively. In general, the total substantially length of the corrugated sheet is 2–3 times of the flat sheet in a honeycomb structure, thus, the thermal expansion length of the corrugated sheet is 2–3 times of the flat sheet. The main reason of the honeycomb structure deformation is due to the shear stress paralleling to the cut surface of the substrate generated by the thermal expansion.

Figure 1:
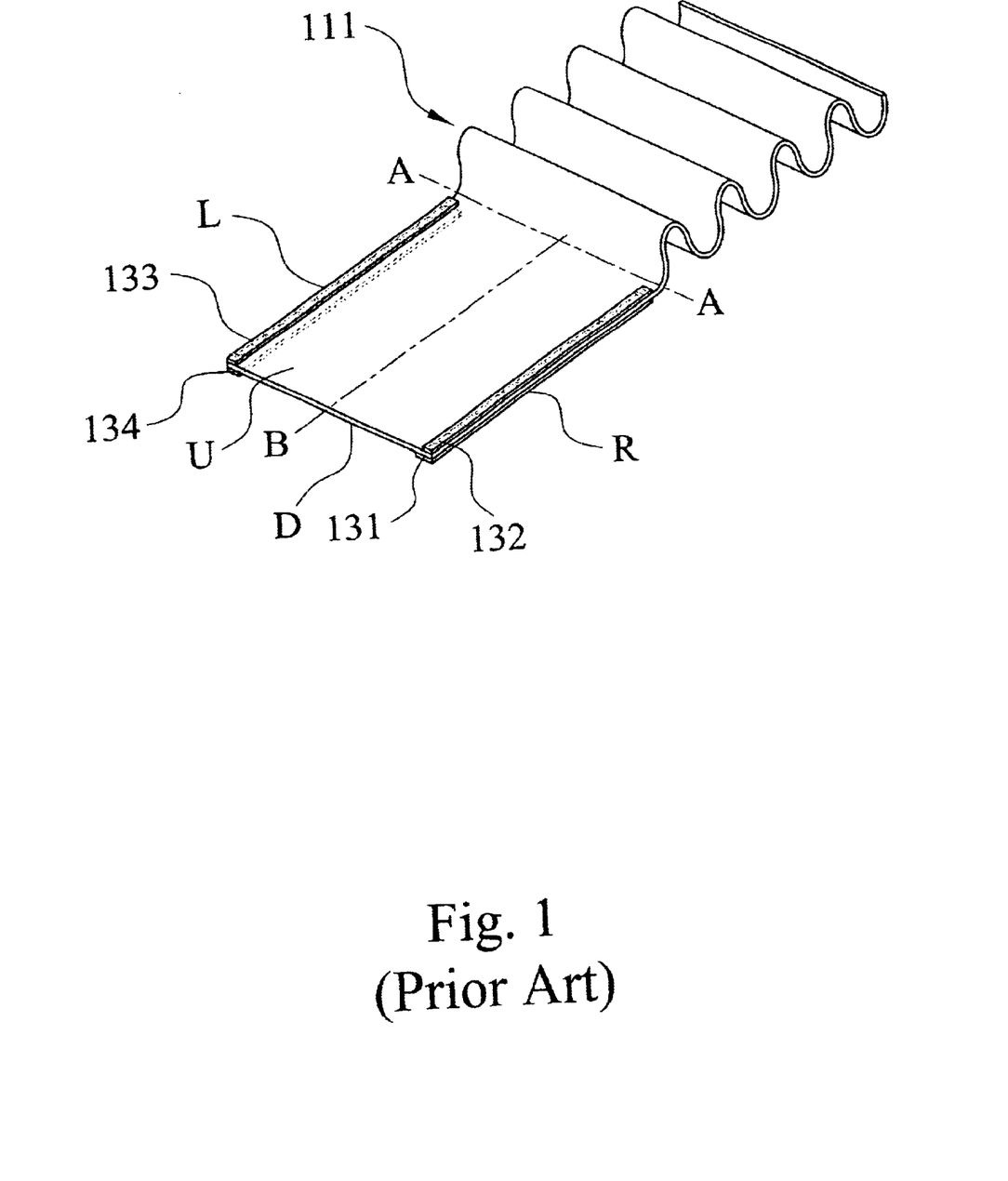
FIG. 1 is a perspective diagram of a substrate with solders thereon in accordance with the conventional structure.
Figure 2:
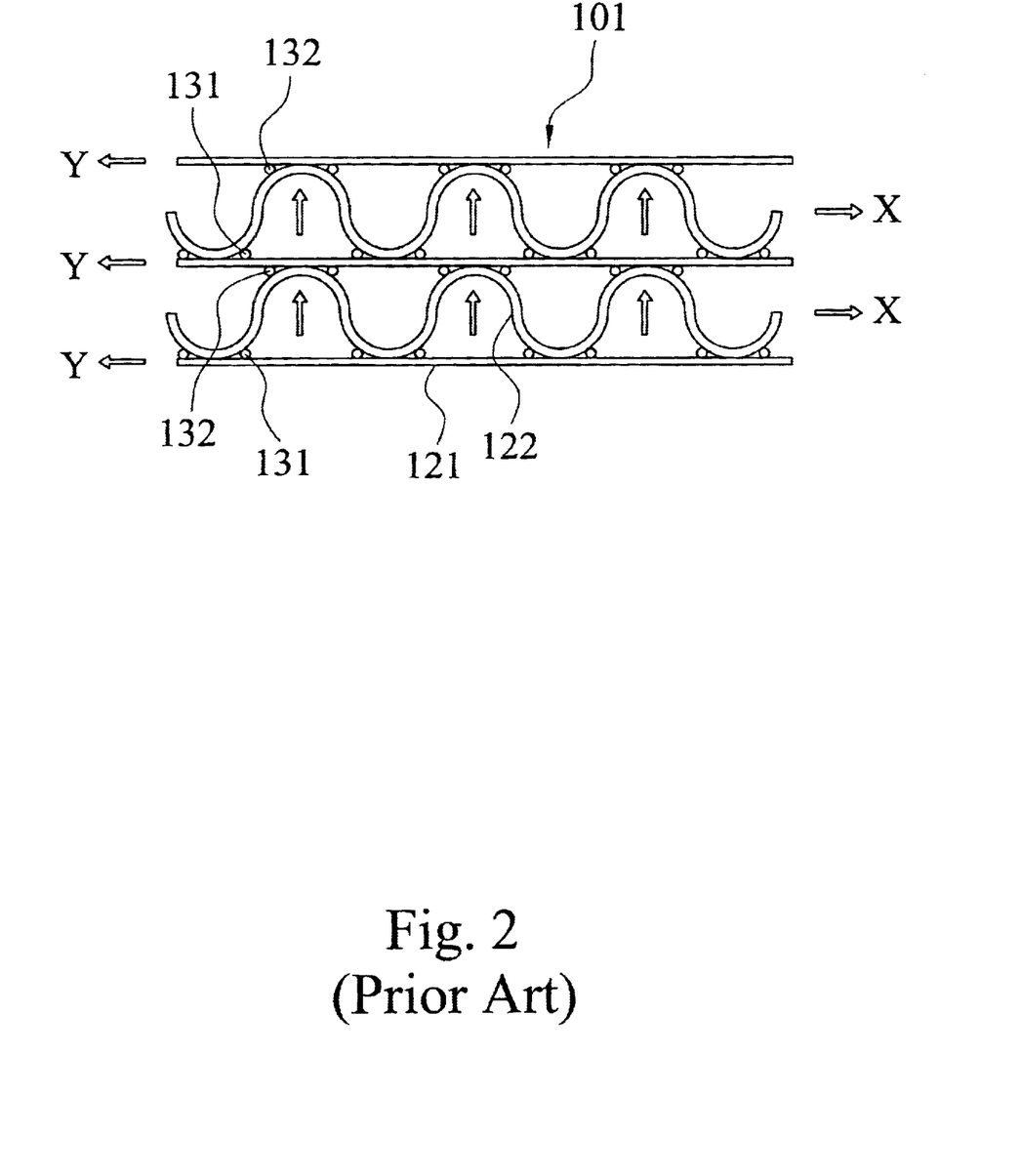
FIG. 2 is an enlarged view showing the principle part of a conventional honeycomb structure.
Figure 3:
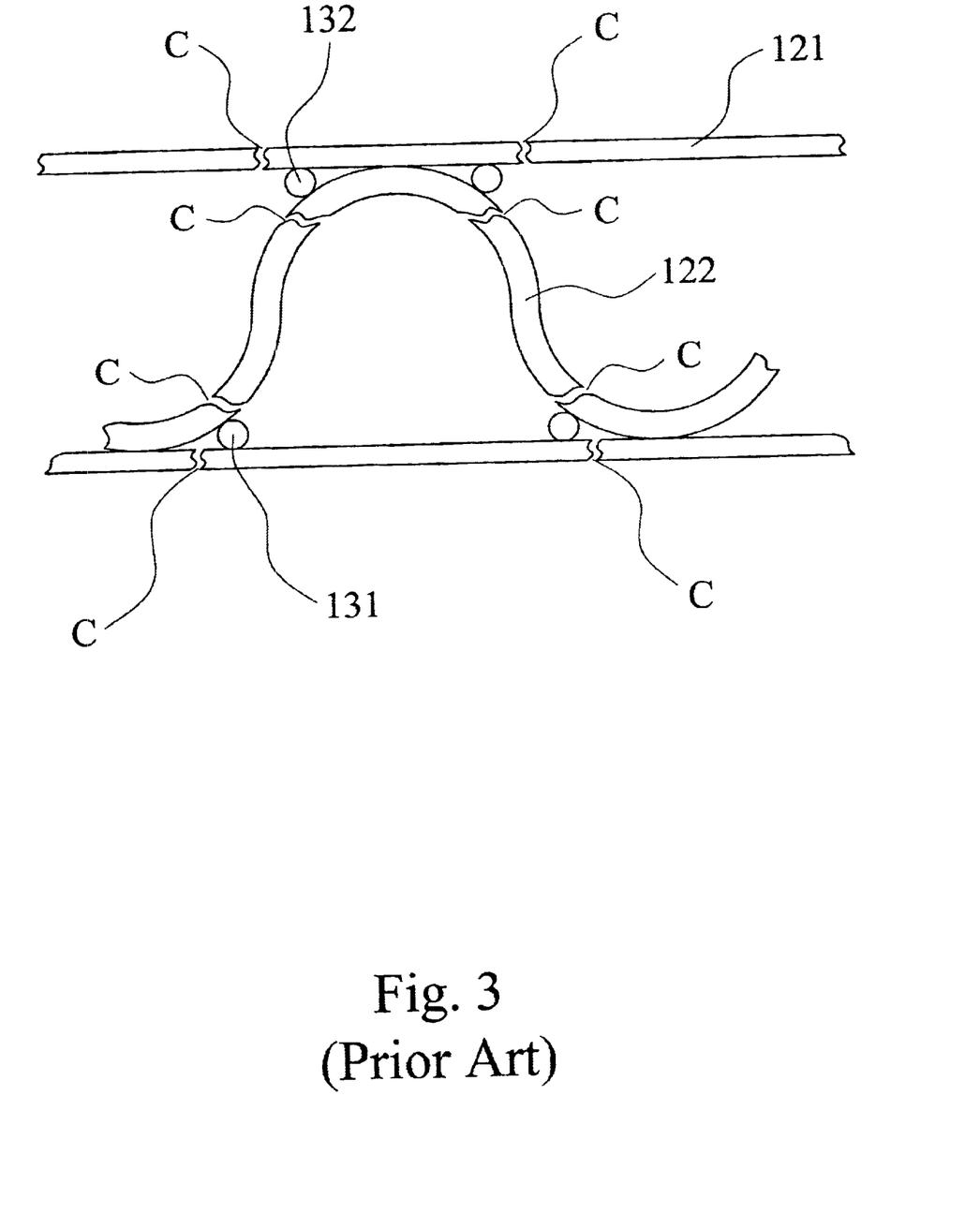
FIG. 3 is another enlarged view showing the principle part of a conventional honeycomb structure.
Figure 4:
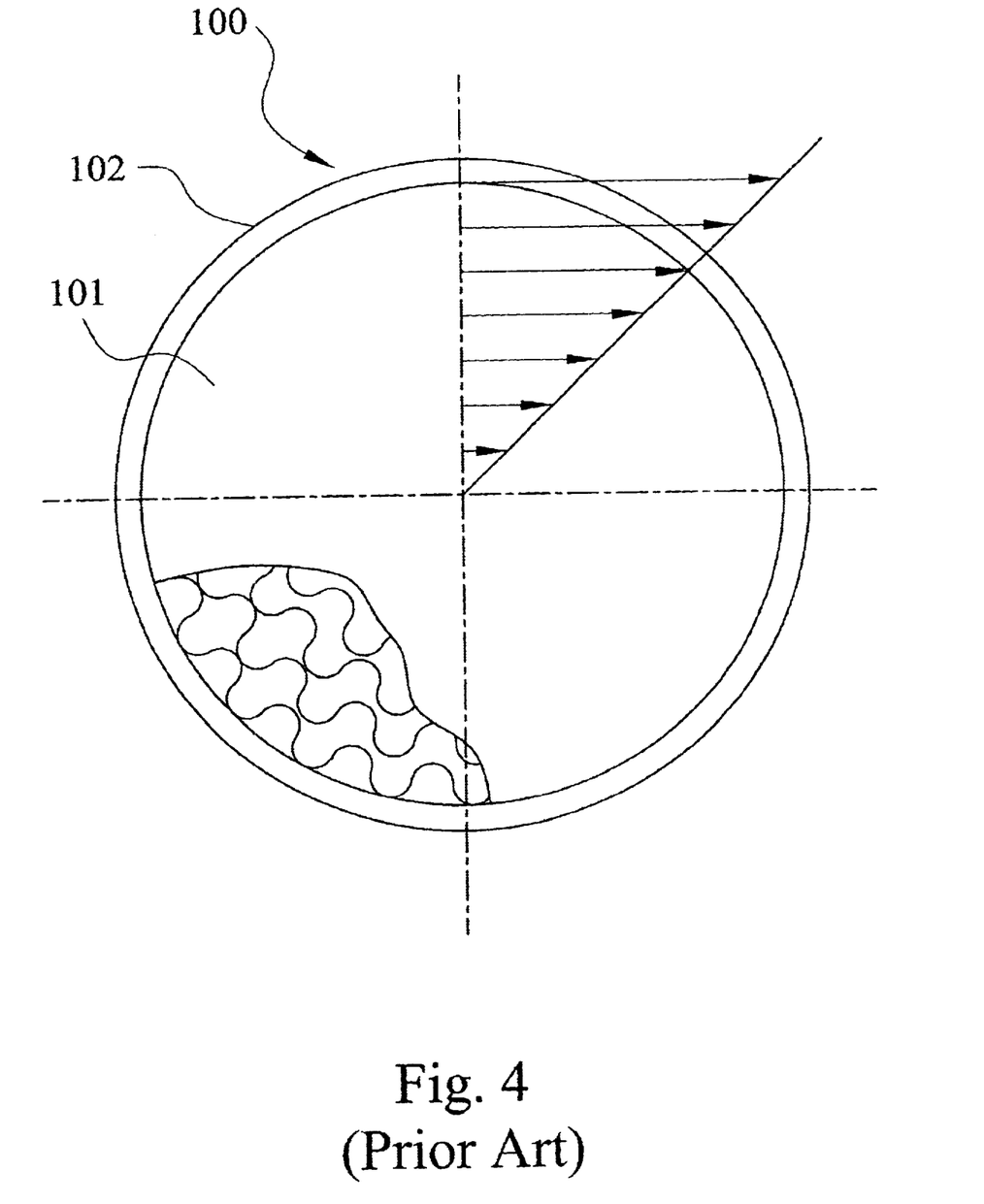
FIG. 4 is a stress distribution diagram for the conventional heat resistant structure.
Figure 5:
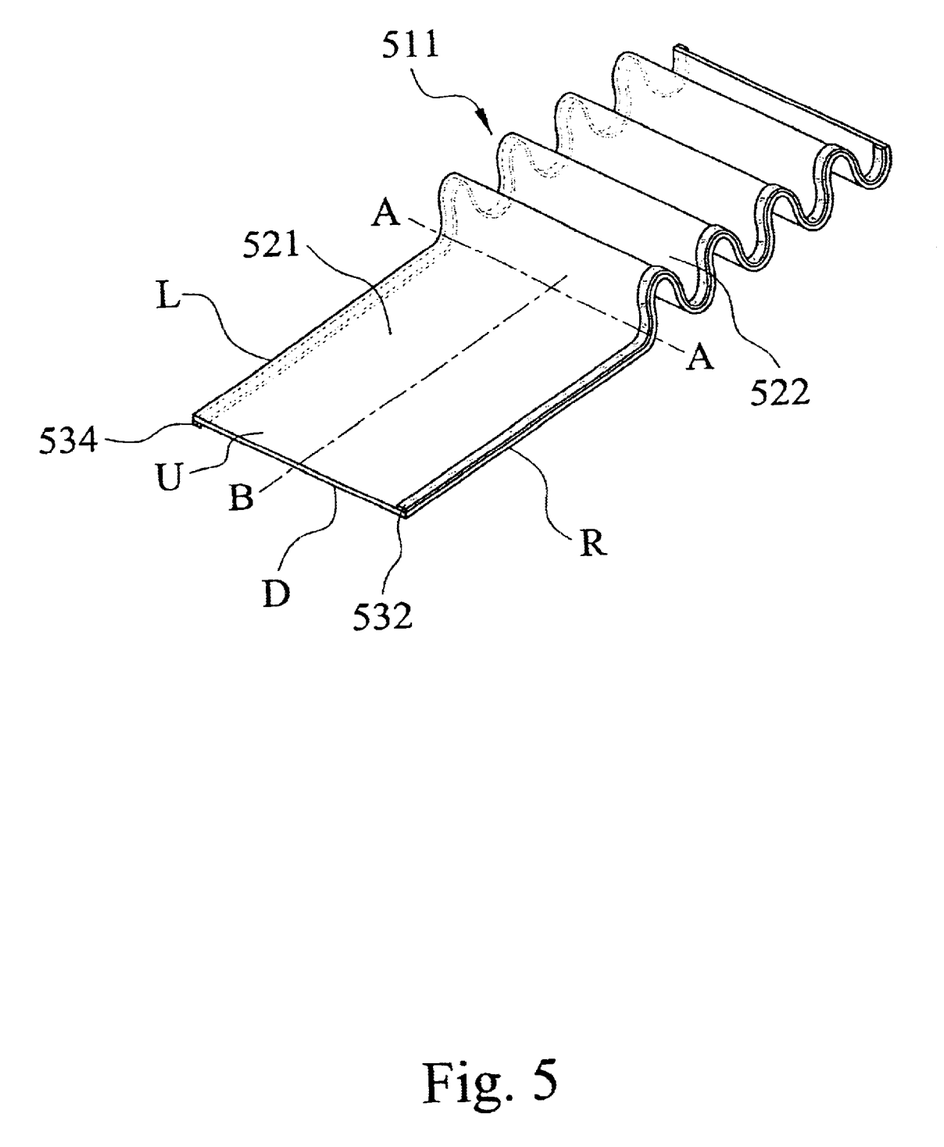
FIG. 5 is a perspective diagram of a substrate with solders thereon in accordance with the present invention.
Figure 6:
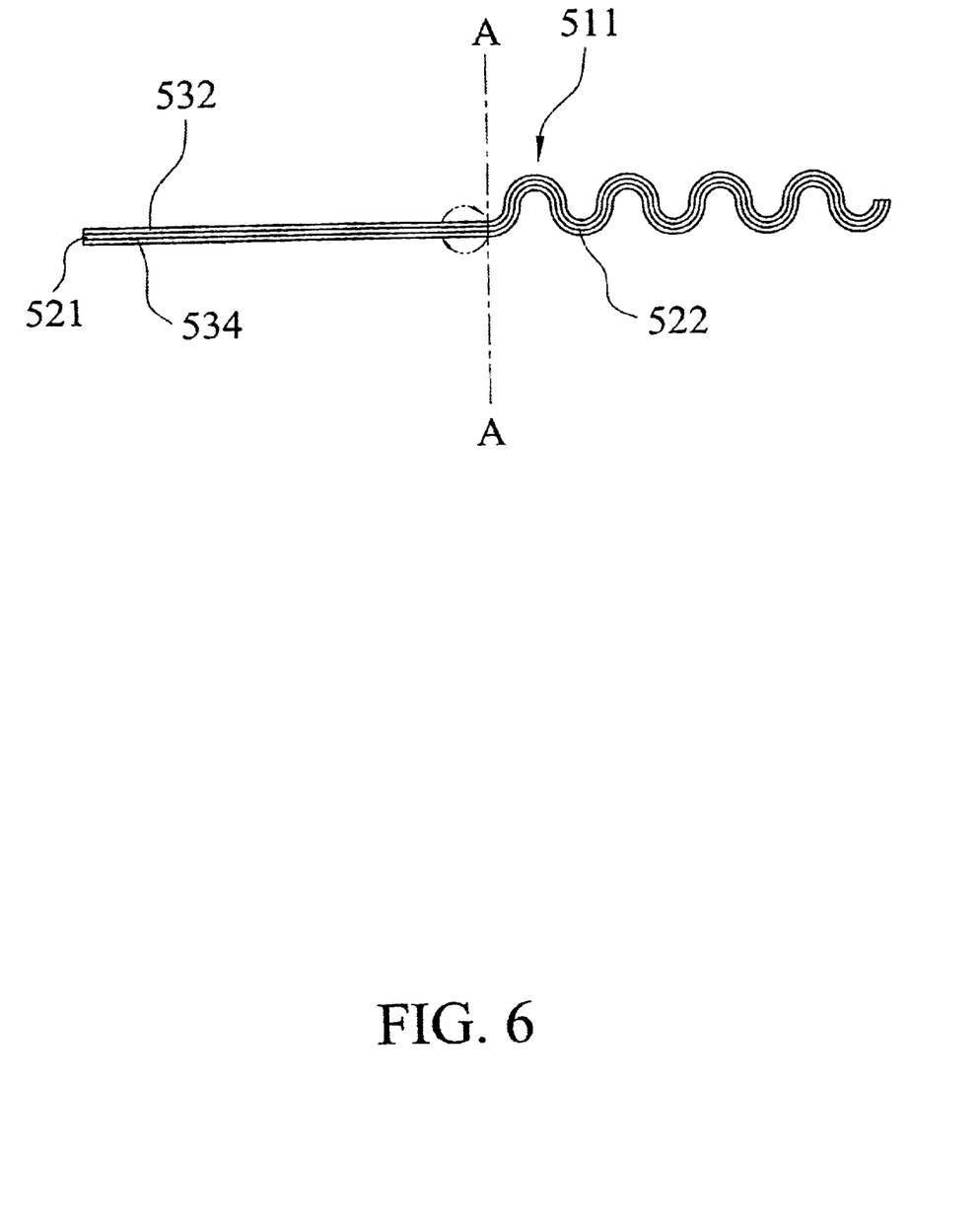
FIG. 6 is a lateral view of the FIG. 5.

However, refer to the FIG. 1, the typical locations of the solder 132, 133 are on the plane surface U of the substrate 111 alongside both two edges R and L, similarly, the solder 131 and 134 are disposed on the plane surface D alongside both two edges R and L with any arbitrarily width respectively. The FIG. 2 shows the enlarged view of the principle part of a honeycomb structure 101, which is after rolling up the substrate 111 (shown in FIG. 1). Obviously, from an end view, the solders 131 and 132 will be located between the flat sheet 121 and corrugated sheet 122 after welding, and as a result, when the corrugated sheet 122 withstands the thermal expansion stress, it may cause deformation by the solders 131 and 312 fixing on the substrate 111. Particularly, there is no flexible space for the substrate 111 since the solders 131 and 132 are fixing on and between the flat and corrugated sheet 121 and 122. After high thermal welding, the solders 131 and 132 may be agglomerated into spot-form (as shown in FIGS. 2 and 3) by its surface tension. Furthermore, see the FIG. 2, the corrugated sheet 122 may be pushed toward in the direction X by thermal expansion, and the flat sheet 121 may hold it back due to the smaller measurement of thermal expansion. Consequently, the thermal stress is generated in the opposite direction X and Y for the honeycomb structure 101. Refer to the FIG. 4, the stress is increasing from the center to the outer of the honeycomb structure 101 for the conventional heat resistant structure 100 due to the thermal difference causing by the different speed of emission flowing, hence, see the FIG. 3, the point C of the flat and corrugated sheets 121 and 122 near the hollow cylindrical steel 102 may be cracked by the thermal stress.

In the U.S. Pat. No. 5,302,355 show an exhaust purifying device and method of producing the same. However, it only shows the structure of the honeycomb structure without indicating the disposition of the solder. Therefore, the present invention provides a solder disposed configuration for a heat resistant structure to have more flexible space for solder fixing between the corrugated sheet and flat sheet withstanding the thermal expansion stress. And furthermore, the present invention may be used in variety of the honeycomb structures for solving the problem of providing flexible space.

SUMMARY OF THE INVENTION

The present invention provides a solder disposed configuration for a heat resistant structure for forming a catalytic converter for purifying the exhaust gas in an engine. The heat resistant structure is composed of a honeycomb structure fitted and fixed into a hollow cylindrical shell. The honeycomb structure comprises at least a substrate having a flat sheet and a corrugated sheet. A first and a second strip of solder are disposed alongside a first and a second edge paralleling to each other on a first and a second plane surface of the substrate respectively, wherein the second plane surface is the reverse side of the first plane surface of the substrate, and the first and second edge are opposite to each other on the first and the second plane surface respectively for forming the honeycomb structure. Rolling up the substrate to form the honeycomb structure (e.g. spirally wound-form) by the solder disposed on the substrate to weld and join the flat and corrugated sheets together. Thereafter, heat them with high temperature and under vacuum condition to weld the solders for joining and fixing each other. Furthermore, the catalyst is coated on the surface of the heat resistant structure to form a catalytic converter for purifying the exhaust gas in an engine.

Accordingly, the solder disposed configuration for a heat resistant structure provided by the present invention may make the substrate having more flexible space in the two sides thereof. Therefore, the substrate has two flexible spaces for expanding and/or contracting under the high thermal stress so as to solve the conventional problem of honeycomb structure deformation causing by the lack of a flexible space.

DESCRIPTION OF THE PREFERRED EMBODIMENTS

According to the disadvantages of conventional heat resistant structure deformation as described above, the present invention provides an improvement solution for that. Embodiments of this invention will be described in detail with reference to attached drawings.

The improvement in accordance with the present invention is provided for solving the problems described in the background, such as the flat and corrugated sheet cracked by the thermal stress and structure deformation . . . etc. The present invention provides a solder disposed configuration for a heat resistant structure for forming a catalytic converter for purifying the exhaust gas in an engine. FIGS. 5 through 8 show preferred embodiment for the heat resistant structure. First, refer to the FIG. 7, the heat resistant structure 500 is composed of a honeycomb structure 501 fitted and fixed into a hollow cylindrical shell 502. Next, see the FIGS. 5 and 6, the honeycomb structure 501 comprises at least a substrate 511 having a flat sheet 521 and a corrugated sheet 522. A first strip of solder 532 and a second strip of solder 534 are disposed alongside a first edge R and a second edge L paralleling to each other on a first plane surface U and a second plane surface D of the substrate 511 respectively, wherein the second plane surface D is the reverse side of the first plane surface U of the substrate 511, and the first edge R and second edge L are opposite to each other on the first and the second plane surface U and D respectively. Particularly, the strips of the solder 532 and 534 may be disposed adjacent to the edge R and L respectively having a specific distance away from the centerline B of the flat sheet 521. Alternate rolling up the substrate 511 is started at a predetermined line A—A between the flat sheet 521 and the corrugated sheet 522 for forming the honeycomb structure 501. Thereafter, heating them with high temperature and under vacuum condition to weld the solders 532 and 534 for forming the honeycomb structure 501 (e.g. sprially wound-form), as shown in FIG. 8. Therefore, the substrate 511 has two flexible spaces (comparing the FIG. 8 of the invention with the FIG. 2 of the traditional type) for expanding and/or contracting under the high thermal stress so as to solve the conventional problem of honeycomb structure deformation causing by the lack of a flexible space. Moreover, the specific width of the strip of solders 532 and 534 if within 10 mm, composed of a nickel (Ni)-base soldering material, formed in strip-shape foil, or formed in a soldering paste.

Figure 7:
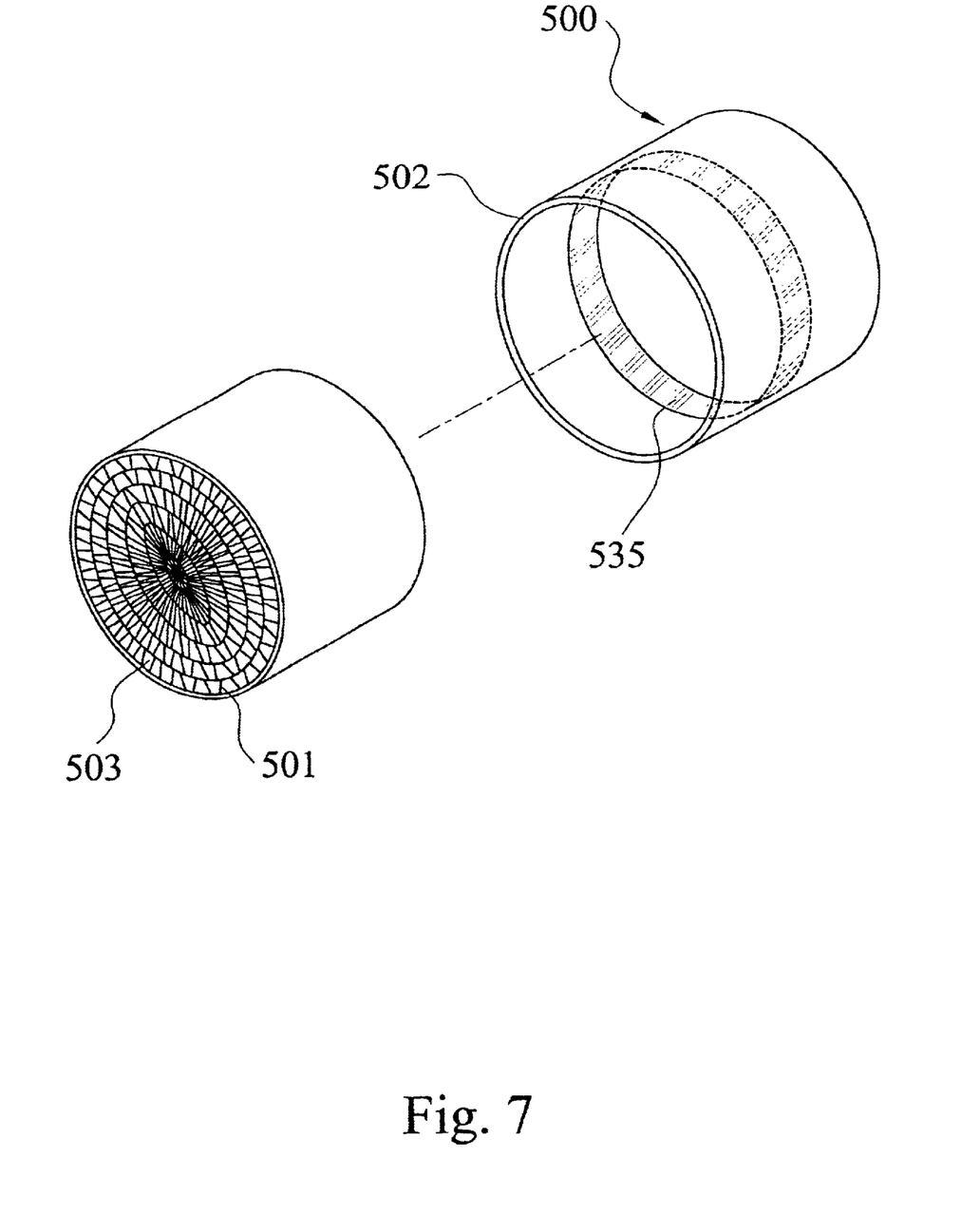
FIG. 7 is a perspective view of a heat resistant structure of an embodiment of the present invention.
Figure 8:
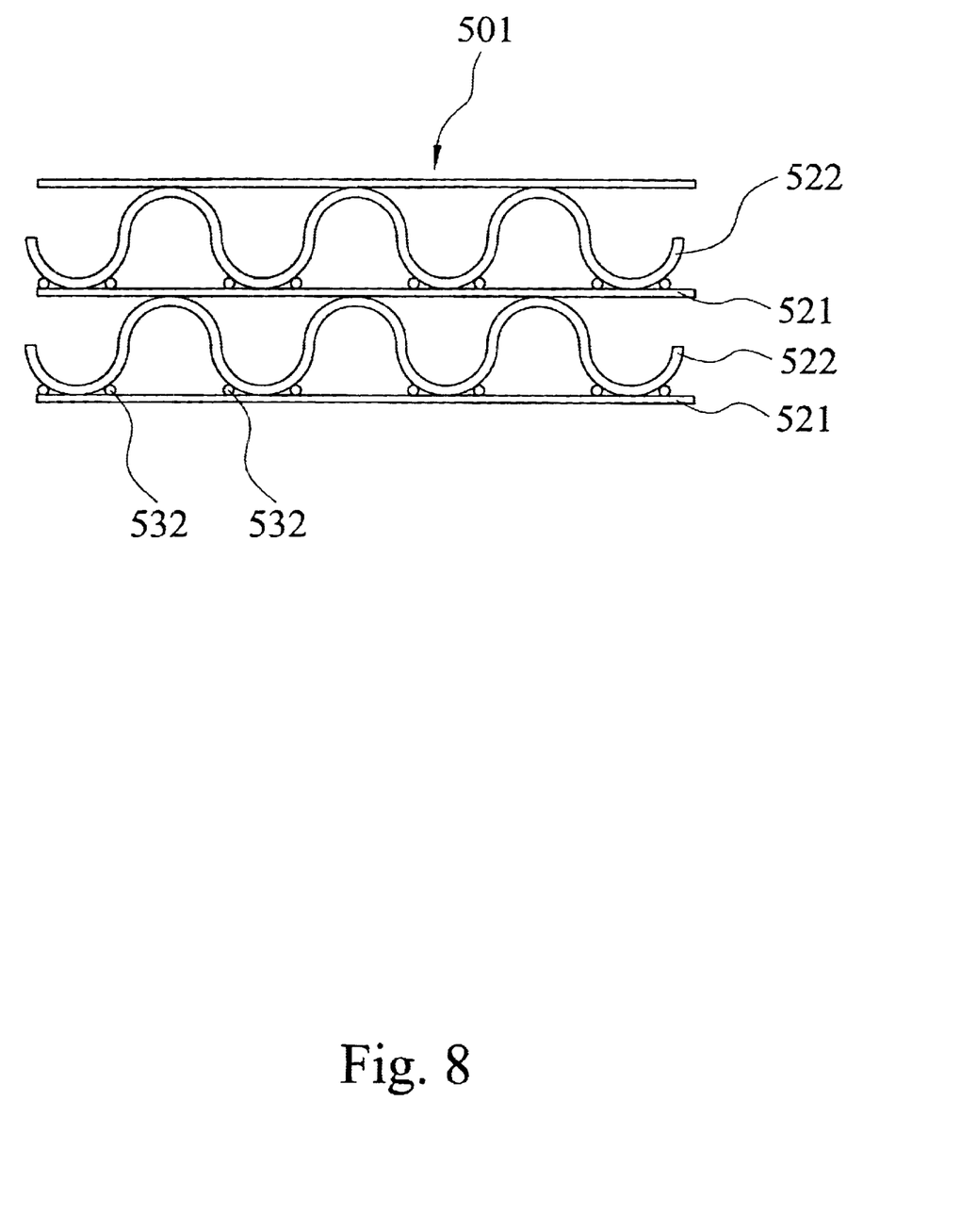
FIG. 8 is an enlarged view showing the principal part of a honeycomb structure according to the present invention.

In addition, see the FIG. 7, the solder 535 is disposed on an inner peripheral wall of the hollow cylindrical shell 502 adjacent to a central portion thereof for fitting and fixing the honeycomb structure 501 into the hollow cylindrical shell 502 to form the heat resistant structure 500 after welding. Refer to the FIGS. 5 and 6, the substrate 511 having a flat sheet 521 and a corrugated sheet 522 is applied with two strips of solder 532 and 534 adjacent to the edge R and L and on the surface U and D respectively, thereafter rolled up from a predetermined line A—A. Meanwhile, the solder 535 is disposed on an inner peripheral wall of the hollow cylindrical shell 502 adjacent to a central portion thereof, and next, heating them with high temperature and under vacuum condition to weld the solders 532, 534, and 535 for forming the honeycomb structure 501 (e.g. spirally wound-form) and fitting into the hollow cylindrical shell 502, as shown in FIG. 7. The solders 532, 534, and 535 are composed of a nickel (Ni)-based solder material, formed in strip-shape foil, or formed in a soldering paste. Besides, the strips of the solder 532 and 534 have a specific width within 10 mm.

After forming the heat resistant structure, the catalyst (such as the noble metal catalyst: platinum Pt, palladium Pd, and rhodium Rh) is coated on its surface to form a catalytic converter for purifying the exhaust gas in an engine. In addition, the catalytic converter is disposed between the exhaust outlet and the tailpipe of the engine, so when the gas flowing through a channel 503 fronting the exhaust outlet of the engine, see the FIG. 7, the catalyst works actively to purify the exhaust gas (e.g. noxious gas). As to the noxious emissions, carbon monoxide (CO), hydrocarbons (HC), and nitrogen oxides (NOx) may change to carbon dioxide ($CO_2$), water ($H_2O$), and nitrogen ($N_2$) by the catalytic action. Accordingly, refer to the FIG. 8, the solder disposed configuration for a heat resistant structure provided by the present invention may make the substrate 511 having more flexible space in the two sides thereof after forming the honeycomb structure 501. Therefore, the substrate 511 has two flexible spaces for expanding and/or contracting under the high thermal stress without fixing the whole surface of the flat 521 and the corrugated sheet 522. As a result, the cracking will not be caused by the lack of a flexible space under the thermal stress, even though the corrugated sheet 522 expanding under the high thermal condition. Consequently, a solder disposed configuration for a heat resistant structure for forming a catalytic converter for purifying the exhaust gas in an engine provided by the present invention will prevent the heat resistant structure deformation from the thermal stress.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A heat resistant structure comprising:

a honeycomb structure having at least one substrate, the substrate having a single first solder strip on a first side and a single second solder strip on a second side thereof, the substrate having:
   a) at least one flat sheet portion having the single first solder strip on a first side and the single second solder strip on a second side thereof opposite the first side, the single first solder strip and the single second solder strip being adjacent to opposite edges of the flat sheet; and
   b) at least one corrugated sheet portion having the single first solder strip on a first side and the single second solder strip on a second side thereof opposite the first side, the first single solder strip and the second single solder strip being adjacent to opposite edges of the corrugated sheet, wherein the substrate is rolled to form the honeycomb structure having a plurality of channels, the honeycomb structure being heated to a high temperature in a vacuum condition to weld the single solder strips.

2. The heat resistant structure according to claim 1, further comprising a hollow cylindrical shell, wherein the honeycomb structure is inserted into a center of the hollow cylindrical shell.

3. The heat resistant structure according to claim 2, wherein the hollow cylindrical shell structure has a third solder strip on an interior circumference thereof.

4. The heat resistant structure according to claim 1, wherein the first solder strip and the second solder strip are parallel one to the other.

5. The heat resistant structure according to claim 1, wherein the first solder strip and the second solder strip have a specific width of no greater than 10 mm.

6. The heat resistant structure according to claim 1, wherein the first solder strip and the second solder strip comprises a nickel (Ni)-base soldering material.

7. The heat resistant structure according to claim 1, wherein the first solder strip and the second solder strip comprises a strip-shaped foil.

8. The heat resistant structure according to claim 1, wherein the first solder strip and the second solder strip comprises a soldering paste.

9. The heat resistant structure according to claim 1, wherein the heat resistant structure is coated with a catalyst.

* * * * *